US012693913B2

(12) United States Patent
Hirsch et al.

(10) Patent No.: US 12,693,913 B2
(45) Date of Patent: Jul. 28, 2026

(54) DATA STRUCTURE FOR A BUFFER MEMORY IN A MULTI-PRODUCER MULTI-CONSUMER SYSTEM

(71) Applicant: Robert Bosch GmbH, Stuttgart (DE)

(72) Inventors: Gerd Hirsch, Beilstein (DE); Matthias Killat, Berlin (DE)

(73) Assignee: ROBERT BOSCH GMBH, Stuttgart (DE)

( * ) Notice: Subject to any disclaimer, the term of this patent is extended or adjusted under 35 U.S.C. 154(b) by 439 days.

(21) Appl. No.: 18/251,369

(22) PCT Filed: Nov. 2, 2021

(86) PCT No.: PCT/EP2021/080314
§ 371 (c)(1),
(2) Date: May 30, 2023

(87) PCT Pub. No.: WO2022/090560
PCT Pub. Date: May 5, 2022

(65) Prior Publication Data
US 2024/0004733 A1      Jan. 4, 2024

(30) Foreign Application Priority Data
Nov. 2, 2020    (DE) .................... 10 2020 213 741.2

(51) Int. Cl.
*G06F 3/06*          (2006.01)
*G06F 9/54*          (2006.01)
(52) U.S. Cl.
CPC .............. *G06F 9/544* (2013.01); *G06F 9/546* (2013.01)

(58) Field of Classification Search
CPC ................................ G06F 9/544; G06F 9/546
See application file for complete search history.

(56) References Cited

U.S. PATENT DOCUMENTS

| | | | |
|---|---|---|---|
| 5,347,648 A | 9/1994 | Stamm et al. | |
| 5,682,553 A | 10/1997 | Osborne | |
| 7,243,354 B1 | 7/2007 | Chhabra et al. | |
| 9,760,493 B1 * | 9/2017 | Wang | G06F 12/0868 |
| 10,210,106 B2 * | 2/2019 | Aden | G06F 13/1642 |
| 2006/0123156 A1 * | 6/2006 | Moir | G06F 9/526 |
| | | | 710/33 |
| 2009/0043927 A1 * | 2/2009 | Inoue | G06F 5/10 |
| | | | 710/52 |
| 2010/0242051 A1 * | 9/2010 | Roettger | G06F 9/544 |
| | | | 711/147 |
| 2022/0043687 A1 * | 2/2022 | Svennebring | G06Q 20/123 |

OTHER PUBLICATIONS

Ruslan Nikolaev et al. "A Scalable, Portable, and Memory-Efficient Lock-Free FIFO Queue", Aug. 13, 2019 (Year: 2019).*
International Search Report for PCT/EP2021/080314, Issued Feb. 16, 2022.

* cited by examiner

*Primary Examiner* — Pierre Vital
*Assistant Examiner* — Abdou K Seye
(74) *Attorney, Agent, or Firm* — NORTON ROSE FULBRIGHT US LLP

(57) ABSTRACT
A data structure for a buffer memory for a multi-producer multi-consumer system. The data structure includes at least one slot for storing data, a first queue, a second queue, a third queue. Each slot of the buffer memory is assigned a unique identifier. At all times, each of the identifiers being assigned either to the first queue or to the second queue or to the third queue.

8 Claims, 5 Drawing Sheets

Fig. 3

DATA STRUCTURE FOR A BUFFER MEMORY IN A MULTI-PRODUCER MULTI-CONSUMER SYSTEM

FIELD

The present invention relates to a data structure for a buffer memory in a multi-producer multi-consumer system.

BACKGROUND INFORMATION

Applications in distributed systems, in particular, for the at least semi-automated driving, require efficient ways of transferring data safely between concurrent processes. One way of achieving this is the use of shared memory and the transfer of the data or, more efficiently, only the pointers to the data with the aid of buffer memories. The buffer memory is generally limited in its capacity and is typically implemented as a ring buffer. Since these buffer memories are utilized simultaneously by multiple processes, they must be thread-safe and accordingly free of race conditions. This is typically achieved by the use of locks. The use has the serious disadvantage that the risk of a deadlock exists if a process is terminated abnormally while this process still holds a lock, since the held lock in such a case is typically not or no longer released.

SUMMARY

Since this is unacceptable in high safety domains, such as in at least semi-automated driving, the present invention provides a lock-free buffer memory, the capacity of which may be changed even during operation. This may be important since, although it is necessary to know the capacity at the time of compilation (in order to avoid dynamic memory usage for reasons of safety), the actual required capacity within may be known only at the start or even become known only during run-time. This applies, in particular, in a service-oriented scenario, in which applications dynamically offer and subscribe to services, i.e., the full connection properties and requirements of the applications become known only during run-time.

The present invention provides a data structure for a buffer memory.

The data structure according to an example embodiment of the present invention is suitable for a buffer memory. The buffer memory includes at least one slot for storing data. Each slot of the buffer memory is assigned a unique identifier.

A slot in the present case is understood to mean a memory area, which is suitable for storing general data types.

The buffer memory is suitable to be used in a multi-producer multi-consumer system (MPMC system). An MPMC system in the present case may be understood to mean a communication system, in which a single data producer or multiple data producers (producer) and a single data consumer or multiple data consumers (consumer) is or are involved. In this case the data exchange between the producer or producers and the consumer or consumers takes place via the data structure according to the present invention. Producers and consumers may represent processes within the same application as well as belong to different applications. In the latter case, the use of the data structure according to the present invention in a shared memory environment is provided for the data exchange.

The data structure further includes a first queue, a second queue, and a third queue.

According to an example embodiment of the present invention, the data structure of the present invention is characterized by the fact that at any time, each unique identifier for the at least one slot of the buffer memory is assigned to either the first queue or to the second queue or to the third queue.

"Being assigned" in the present case may be understood to mean that the identifier is deposited or stored in the assigned queue.

According to an example embodiment of the present invention, the first queue, the second queue, and the third queue are assigned identifiers or indices. These queues are therefore referred to below as index queues.

The index queues manage the unique identifiers for the slots of the buffer memory. The identifiers are necessary for accessing the corresponding slot of the buffer memory.

In this way, the present invention achieves the object of providing a data structure for the exchange of data of copyable general data types in a communication system that includes a plurality of producers and a plurality of consumers (Multi-Producer Multi-Consumer system, MPMC system), which are able to be adapted in terms of their capacity. The adaptation of the capacity advantageously takes place in the data structure according to the present invention without the use of dynamic memory usage. The use in a shared memory environment is therefore possible. Furthermore, the adaptation of the capacity to write and read activities of the concurrent processes may take place during the operation.

According to one specific embodiment of the data structure of the present invention, each identifier is represented with the aid of an integer value.

This specific embodiment has the advantage that integer values may be represented with the aid of simple data types.

According to one specific embodiment of the data structure of the present invention, the integer value representing the identifier represents the identifier and the write-in cycle.

This specific embodiment is based on the finding that in the event the number of identifiers required in order to uniquely identify each slot of the buffer memory of the data structure is smaller than the number of the maximum representable integer values, a further piece of information, in addition to the identifier, may be represented with the aid of the integer value.

In currently typical 32-bit or 64-bit systems, the number of required identifiers is typically significantly smaller than the number of maximum representable integer values.

Thus, in the area of at least semi-autonomous driving, it is assumed that the number of required identifiers is in the range of 100 or in the range of multiple millions. By comparison, the number of the maximum representable integer values in 32-bit or 64-bit systems is significantly larger.

The specific embodiment is therefore based on the finding that, in addition to the unique identifier for the slot, it is advantageous to also represent with the aid of the integer value the write-in cycle, in which the identifier has been written into the index queue.

The integer value i in this case may be formed according to the scheme c:p, the scheme fulfilling the following condition:

$$i = c * C + p, \text{ where}$$

$$0 \leq p < C,$$

c being the write-in cycle, C being the capacity of the index queue and p being the written-in identifier.

It is clear that in this specific embodiment, the number of maximum representable identifiers is limited by the capacity C. This must be selected accordingly so that all required identifiers for the buffer memory are able to be represented.

According to one specific embodiment of the data structure according to the present invention, the first queue and the second queue and the third queue include in each case a variable for representing the instantaneous write-in position and in each case a variable for representing the instantaneous read position. Such variables are typically utilized when arrays are used for implementing the queues. The fields of the array are then used for writing in (push) and reading (pop) the data. The behavior of the queue is controlled via the variables, which represent the write-in position or the read position. According to this specific embodiment, the variables represent the position as well as the cycle, i.e., the write-in cycle and the read cycle. This means, the variables for representing the write-in position represent the write-in position as well as the write-in cycle in which the corresponding queue is situated. Accordingly, the variable of the read position represents the read position as well as the read cycle in which the queue is situated. The cycle in this case is increased in the event of a so-called wrap-around. A wrap-around occurs because in order to control the behavior of the queue, i.e., to read the respectively oldest piece of data not yet read and to write in or overwrite the oldest piece of data still in the array, the write-in position and/or the read position is/are shifted further in each case by one field. As a result, when the write-in position and/or the read position has/have arrived at the last field of the array, the positions are set again in the first field of the array.

This specific embodiment has the advantage that the integer value representing the write-in position and/or the read position is monotonically increasing.

An integer value is monotonically increasing when the integer value representing the one particular position, write-in position or read position, becomes greater with each successful write-in operation or read operation.

This property of the integer value for representing the position for the queues achieves the object of creating a data structure, in which it is practically impossible for false positives to occur in compare-and-swap operations (so-called ABA problem).

In theory, a false positive result may occur in the event of an integer overrun. In typical 64-bit systems, in which the number of required positions is significantly smaller than the number of representable integer values, however, this would require that nearly $2^{64}$ write-in operations and read operations would have to be executed on one index queue. Even in the case of one read-in or read operation per nanosecond, it would require hundreds of years of system operation until such a situation arises. Thus, it is practically impossible for such a situation to occur.

According to one specific embodiment of the data structure of the present invention, the first queue and the second queue and the third queue have the same capacity.

According to one specific embodiment of the data structure of the present invention, the first queue and the second queue and the third queue fulfill the FIFO principle.

Fulfilling the FIFO principle may be understood in the present case to mean that the one value that has been initially deposited in the queue or has been stored in the queue is the one first removed from the queue.

According to one specific embodiment of the data structure of the present invention, the first queue and the second queue and the third queue are designed in such a way that lock-free, atomic push operations and lock-free, atomic pop operations may be executed on the queues. This may be advantageously achieved in that the underlying hardware on which the data structure of the present invention is utilized supports compare-and-swap operations natively, i.e., on the hardware side.

A "lock-free operation" may be understood in the present case to mean an operation on a data structure, which takes place without the data structure being locked for the parallel processes.

An "atomic operation" may be understood in the present case to mean a single or a series of operations on a data structure, which either take place or fail as a whole.

According to one specific embodiment of the data structure of the present invention, an access to the at least one slot of the buffer memory is possible only with possession of the identifier assigned to the at least one slot.

The access may be a read access or a write access.

BRIEF DESCRIPTION OF THE DRAWINGS

Specific embodiments of the present invention are explained in greater detail below with reference to figures.

FIG. 3 schematically shows a representation of a data structure according to an example embodiment of the present invention after changing the capacity of the buffer memory.

DETAILED DESCRIPTION OF EXAMPLE EMBODIMENTS

Figure 1:
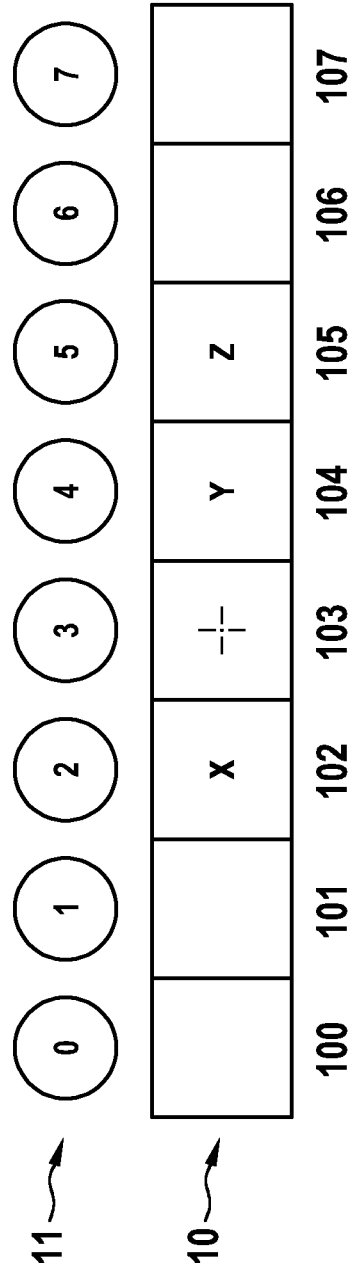
FIG. 1 schematically shows a representation of a buffer memory according to an example embodiment of the present invention.

FIG. 1 schematically shows a representation of a buffer memory of a data structure 1 according to the present invention.

The representation represents buffer memory 10 as an array of slots 100 through 107. Data X, Y, Z are stored in part in slots 100 through 107. Each slot 100 through 107 is assigned a unique identifier 11. The integer values from 0 through 7 are used in the representation for identifiers 11.

Figure 2:
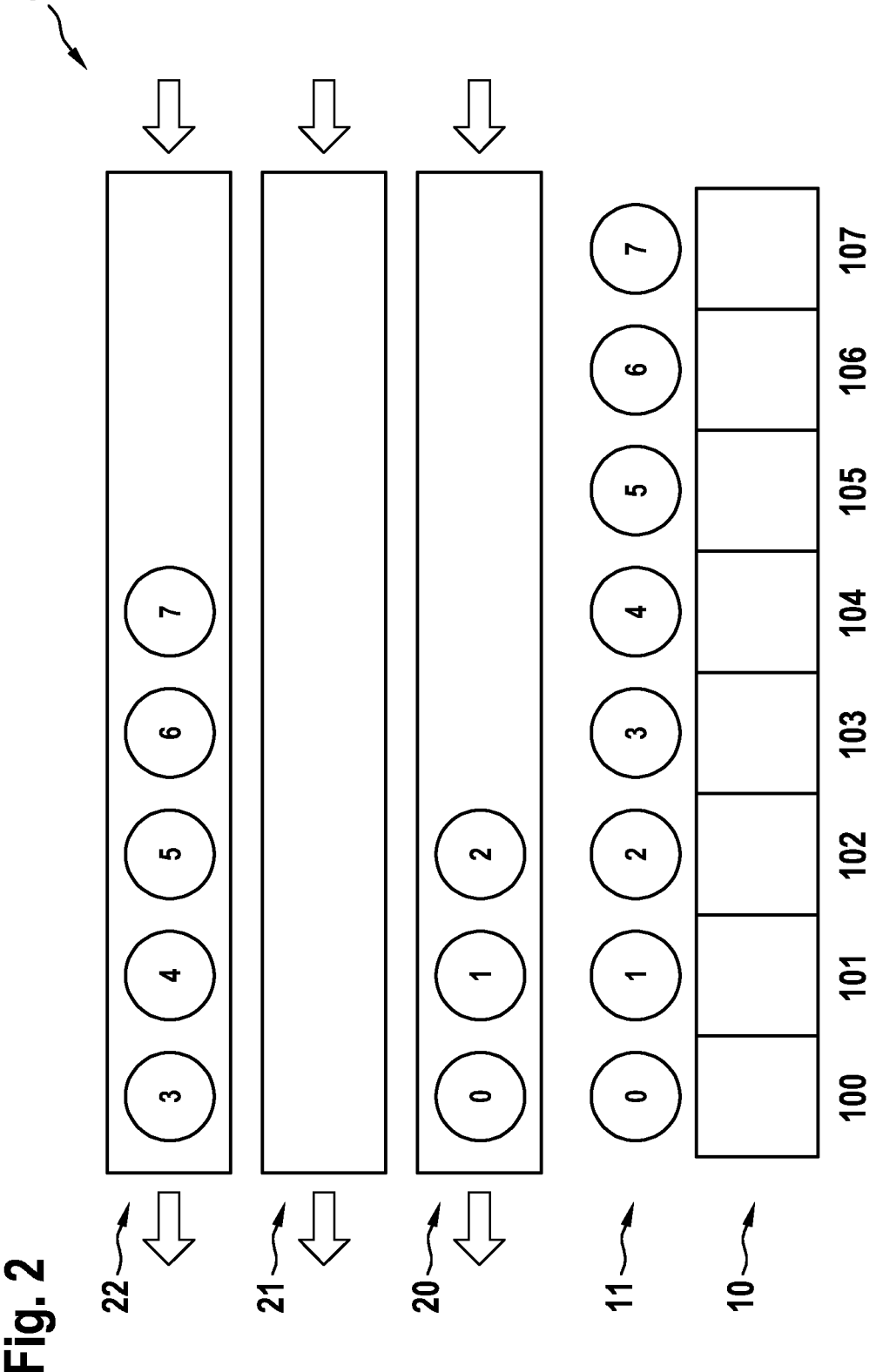
FIG. 2 schematically shows a representation of a data structure according to an example embodiment of the present invention in detail.

FIG. 2 schematically shows a representation of a data structure 1 according to the present invention in detail.

In the lower portion, buffer memory 10 is represented with slots 100 through 107 and with assigned unique identifiers 11 as described above in FIG. 1.

Data structure 1 also includes a first queue 20, a second queue 21, and a third queue 22 for managing buffer memory 10. First queue 20, second queue 21, and third queue 22 are referred to below as index queues.

Index queues 20, 21, 22 may be implemented as waiting queues (FIFO) with a limited capacity. Identifiers 11 or indices assigned to an index queue 20, 21, 22 may be sign-free 64-bit integer values. For the present invention, it is advantageous if the data type is selected in such a way that the executing computer is able to execute the operation "Compare and Swap" (CAS), referred to in short as CAS operation, in an atomic manner.

Index queues further include two further variables, which represent the instantaneous read position and the instantaneous write position. These variables are required in order to draw values from the queue (Pop) and to assign values to the queue (Push).

The three queues 20, 21, 22 receive data, which represent unique identifiers 11, and thereby assign the respective identifier 11 to the respective queue. Characteristic of data structure 1 of the present invention is the fact that at all times identifiers 11 are assigned to either first queue 20 or to second queue 21 or to third queue 22.

In the representation, first queue 20 represents with the aid of identifiers 11 (0, 1, 2) assigned in queue 20 the number of slots 100 through 102 being reserved. "Being reserved" may be understood in the present case to mean that these slots 100 through 102 are provided neither for the storing nor for the reading of data.

Second queue 21 represents the number of slots being used. "Being used" may be understood in the present case to mean that these slots are filled with data, which may be read out by consumers.

In the example shown, no slot is presently used, i.e., the buffer memory is empty.

Third queue 22 represents the number of slots 103 through 107 being open. "Being open" may be understood in the present case to mean that these slots 103 through 107 may be filled with data, which may be set by data producers.

Figure 3:
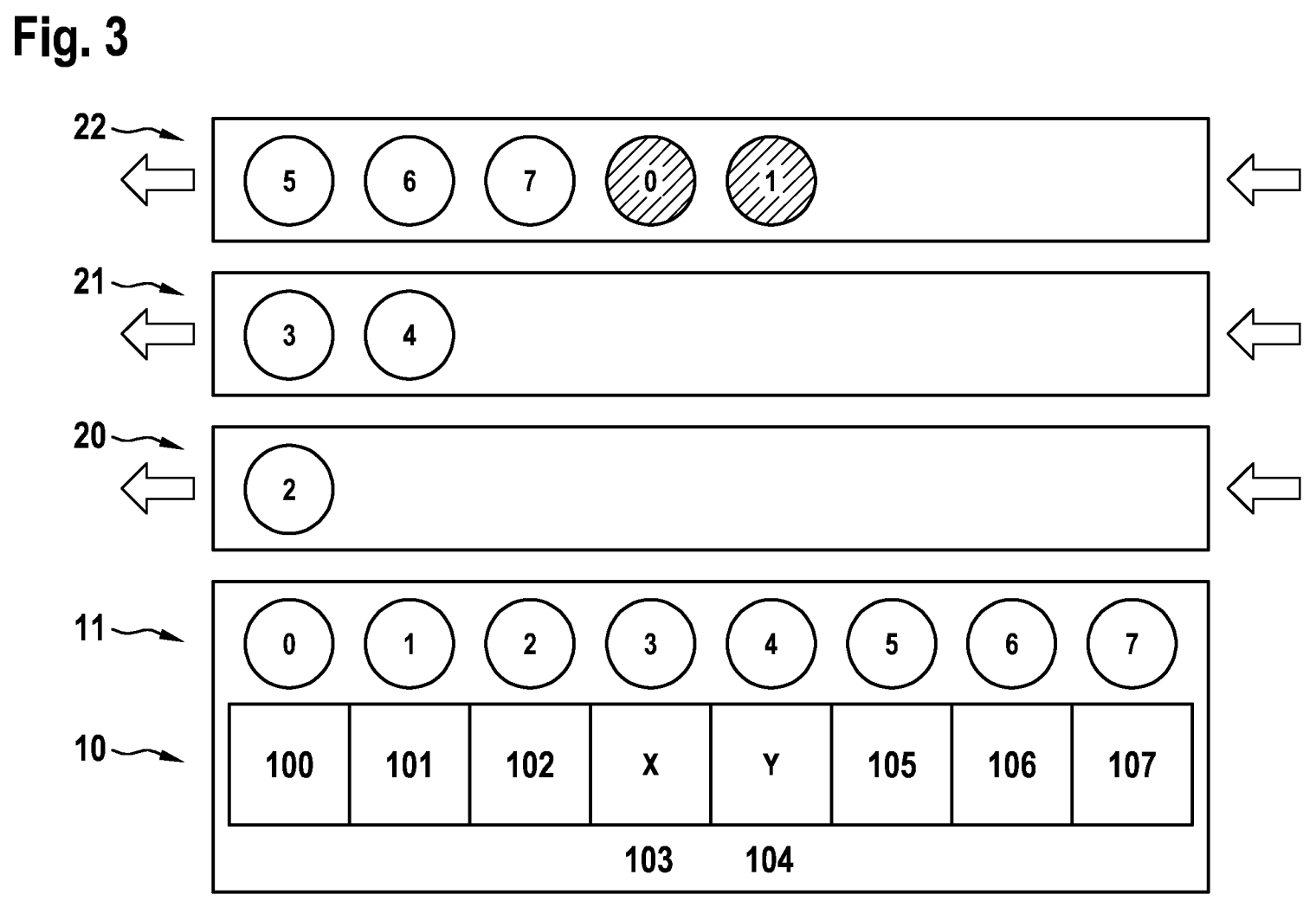

FIG. 3 schematically shows a representation of a data structure 1 according to the present invention after changing the capacity of buffer memory 10.

In particular, the representation in FIG. 3 shows the expansion of the capacity of buffer memory 10. It should be noted here that the amount of memory occupied by buffer memory does not change. As a result of the format of data structure 1 according to the present invention, it is possible to adapt the capacity of buffer memory 10, i.e., the portion of buffer memory 10 usable by applications or processes during run-time.

An expansion in this case takes place by changing the assignment of the unique identifiers 11 to first queue 20 or to third queue 22. First queue 20 is assigned identifiers 11 that represent reserved slots. Third queue 22 is assigned identifiers that represent open slots. By removing a corresponding number of identifiers 11 from first queue 20 and by assigning these identifiers 11 to third queue 22, the slots represented by identifiers 11 in buffer memory 10 become usable for applications or processes.

In the representation of FIG. 3, identifiers 11 (0, 1), which represent slots 100 and 101, have been removed from first queue 20 and assigned to third queue 22.

The removal from first queue 20 and the assignment to third queue 22 in this case takes place within an atomic operation.

Figure 4:
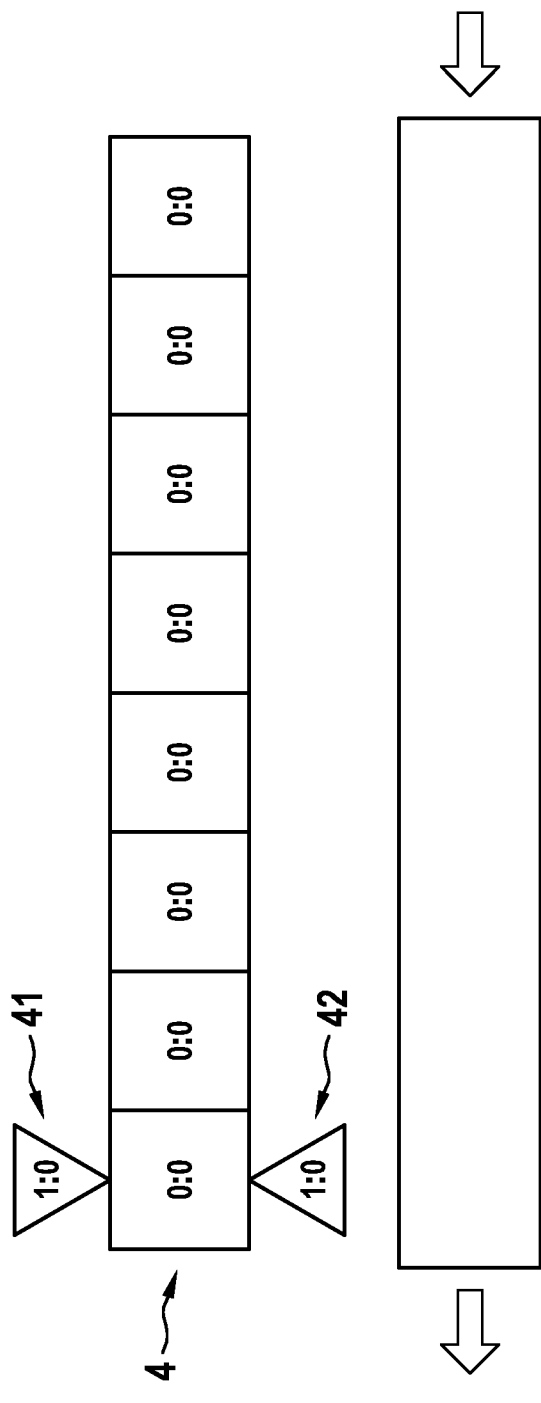
FIG. 4 schematically shows a representation of an index queue according to an example embodiment of the present invention after the empty initialization.

FIG. 4 schematically shows a representation of an index queue according to the present invention.

The internal implementation of the state of an index queue 4 is represented in the upper portion of FIG. 4. The logical representation of index queue 4 is represented in the lower portion.

The state represented is as an empty queue after initialization. In this case, the internal memory of the queue is filled with the values 0:0.

The values are represented according to the scheme c:p and may be stored as an integer value i, which fulfills the following condition:

$$i = c*C + p, \text{ where}$$

$$0 \le p < C,$$

c being the write cycle, in which the value has been written in, C being the capacity of the index queue, and p being the identifier that has been written in.

The variables for representing read position 41 and write position 42 are represented according to the scheme c:p and may be stored as integer value i, which fulfills the following condition:

$$i = c*C + p, \text{ where}$$

$$0 \le p < C,$$

c being the instantaneous write cycle $c_w$ or read cycle $c_r$, C being the capacity of index queue 4 and p being the position to be read next or the position to be described next.

The variables are initialized in each case with the values 1:0. For the write position, this value indicates that the instantaneous write position is at position 0 of index queue 4, i.e., at the first position of index queue 4 and is presently situated in write cycle $c_w = 1$. For read position 41, this value indicates that instantaneous read position 41 is also at position 0 of the index queue and is presently situated in read cycle $c_r = 1$.

The logical representation of index queue 4 thus initiated is represented in the lower portion of FIG. 4. The representation clearly shows an empty index queue 4.

Figure 5:
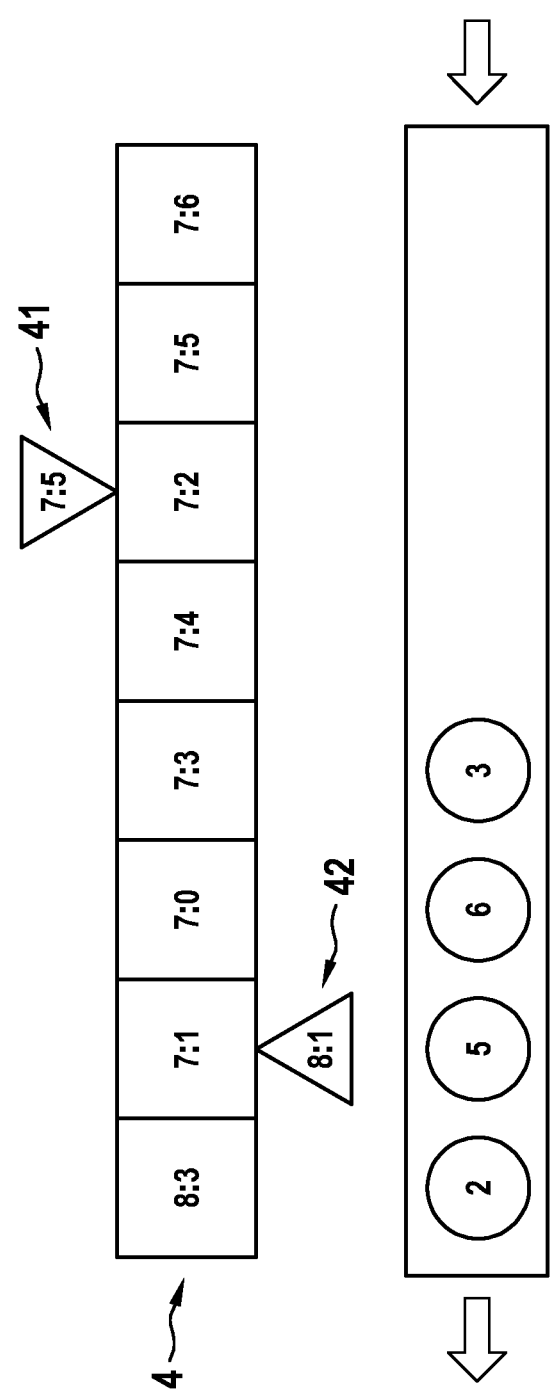
FIG. 5 schematically shows a representation of an index queue according to an example embodiment of the present invention during operation.

FIG. 5 schematically shows a representation of an index queue 4 according to the present invention.

The internal implementation of the state of an index queue 4 is represented in the upper portion of FIG. 5. The logical representation of index queue 4 is represented in the lower portion.

The state represented shows index queue 4 during use. The internal memory is filled with value according to the scheme c:p.

The read position and the write position are also represented according to the scheme c:p. The read position is at position $p_r = 5$ in read cycle $c_r = 7$. The write position is at position $p_w = 1$ in write cycle $c_w = 8$.

Based on the logical representation in the lower portion of FIG. 5, it is apparent that the value 2 is read next. This corresponds to the value 2 at read position 41. The last value written into the index queue is 3. This corresponds to the value 3 at field next to instantaneous write position 42.

FIG. 5 further indicates that write position 42 is at a lower position of index queue 4. At the same time, however, write position 42 is one write cycle $c_w$ further than read position 41.

This indicates that write position 42 includes one wrap around more than read position 41. Write position 42 is therefore situated in a cycle higher by 1 than read position 41.

With the correct implementation of data structure 1 according to the present invention, the integer value that represents instantaneous read position 41 may be no greater than the integer value that represents instantaneous write position 42. If the two values are the same, then this means that read position 41 remains at instantaneous write position 42; this is equivalent to an empty index queue 4. Since a value is unable to be successfully read from an empty index queue 4, the integer value representing instantaneous read positon 41 is not increased. Accordingly, the integer value that represents instantaneous read position 41 may not be greater than the integer value that represents instantaneous write position 42.

Furthermore, the integer value that represents instantaneous write position 42 may never be greater than capacity C of index queue 4 than the integer value that represents instantaneous read position 41. This is explained by the fact that index queue 4 would be full if instantaneous write position 42 is greater by C than the integer value that represents instantaneous read position 41. In this case, a full index queue 4 could, in principle, be written into. It would then depend on the behavior of index queue 4; it would be possible to discard the oldest element in order to create space for a new most recent element. Since index queue 4 according to the present invention manages only so many unique identifiers 11, for which it has capacity, an index queue 4 is full only when it received all identifiers 11. In such a case, no further write-in operation may occur, since no identifiers 11 for writing in are present.

What is claimed is:

1. A buffer architecture for a multi-producer multi-consumer system, the buffer architecture comprising:
   an executing computer; and
   a memory component accessible by the executing computer;
   wherein:
   the memory component includes:
      a buffer memory that the executing computer is configured to access as a plurality of slots in each of which data is storable by the executing computer and which are each assigned a respective one of a plurality of unique identifiers; and
      three index queues managed by the executing computer and representing respective ones of three states into which the slots can be transitioned; the three queues include:
      a first queue that stores a first subset of the identifiers, which correspond to a subset of the slots, which are in a first state of the three states of being inactive and therefore inaccessible for writing thereto and inaccessible for reading therefrom by the executing computer;
      a second queue that stores a second subset of the identifiers, which correspond to a subset of the slots, which are in a second state of the three states of having been written to by a producer and of awaiting reading by a consumer; and
      a third queue that stores a third subset of the identifiers, which correspond to a subset of the slots, which are in a third state of the three states of being currently usable for a new write operation by a producer; and
   the executing computer is configured to access the buffer memory based on the identifiers stored in the first queue, the second queue, and the third queue such that:
      at each moment in time, each of the identifiers is stored in exactly one of the first, second, or third queues, thereby assigning the respective slots identified by the respective identifiers to one of the three states;
      with respect to a respective one of the slots:

a write access to the respective one of the slots of the buffer memory is obtained by the executing computer dequeuing the corresponding identifier of the respective slot from the third queue; and
         a read access to the respective slot is obtained by the executing computer dequeuing the corresponding identifier of the respective slot from the second queue; and
      the identifiers are movable between the queues according to the following transitions:
         (a) from the third queue to the second queue in response to a write operation by the executing computer into the corresponding slot;
         (b) to the third queue after a read operation by the executing computer from the corresponding slot that took place by a dequeuing from the second queue; and
         (c) from the first queue to the third queue in response to the corresponding slot being activated for use as part of the buffer for writing thereto and reading therefrom, a number of the identifiers being held in the third queue thereby defining a dynamically adjustable usable capacity of the buffer memory that is accessible by the executing computer.

2. The buffer architecture as recited in claim 1, wherein each of the identifiers is represented using an integer value.

3. The buffer architecture as recited in claim 2, wherein the integer value represents a corresponding one of the slots and a write-in cycle.

4. The buffer architecture as recited in claim 1, wherein each of the first queue, the second queue, and the third queue includes a variable for representing an instantaneous write-in position and a variable for representing an instantaneous read position, the variables each being represented using a respective integer value that represents both the respective write-in position or read position and an instantaneous cycle.

5. The buffer architecture as recited in claim 1, wherein the first queue, the second queue, and the third queue have the same capacity as one another.

6. The buffer architecture as recited in claim 1, wherein the first queue, the second queue, and the third queue fulfill a FIFO principle.

7. The buffer architecture as recited in claim 1, wherein the buffer architecture is configured for execution of lock-free, atomic push operations and lock-free atomic pop operations on the first queue, the second queue, and the third queue.

8. The buffer architecture as recited in claim 1, wherein, for each of the slots, a read access and/or a write access to the respective slot is possible only with possession of the identifier assigned to the respective slot.

* * * * *